(12) United States Patent
Akahane et al.

(10) Patent No.: US 9,780,547 B2
(45) Date of Patent: Oct. 3, 2017

(54) LONG-SIZE OBJECT FIXTURE

(71) Applicant: Caterpillar SARL, Geneva (CH)

(72) Inventors: Eiji Akahane, Tokyo (JP); Kunitomo Shimizu, Tokyo (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 15/128,722

(22) PCT Filed: Apr. 8, 2015

(86) PCT No.: PCT/EP2015/057617
§ 371 (c)(1),
(2) Date: Sep. 23, 2016

(87) PCT Pub. No.: WO2015/155240
PCT Pub. Date: Oct. 15, 2015

(65) Prior Publication Data
US 2017/0110864 A1    Apr. 20, 2017

(30) Foreign Application Priority Data

Apr. 8, 2014  (JP) .................. 2014-079244

(51) Int. Cl.
*H02G 3/32* (2006.01)
*F16B 2/08* (2006.01)
*F16B 21/08* (2006.01)
*F16L 3/10* (2006.01)

(52) U.S. Cl.
CPC .............. *H02G 3/32* (2013.01); *F16B 2/08* (2013.01); *F16B 21/086* (2013.01); *F16L 3/1058* (2013.01)

(58) Field of Classification Search
CPC combination set(s) only.
See application file for complete search history.

(56) References Cited

U.S. PATENT DOCUMENTS

| 6,364,586 | B1 * | 4/2002 | Okada | F16B 19/1081 |
| | | | | 411/41 |
| 9,631,657 | B2 * | 4/2017 | Zajak | F16B 13/126 |
| 2011/0162171 | A1 | 7/2011 | Gmeilbauer | |

FOREIGN PATENT DOCUMENTS

| DE | 202008008961 U1 | 10/2008 |
| JP | 2-146289 U | 12/1990 |
| JP | 5008982 B2 | 8/2012 |
| WO | WO 2006/030725 A1 | 3/2006 |

OTHER PUBLICATIONS

European Patent Office, International Search Report in International Patent Application No. PCT/EP2015/057617, Aug. 5, 2015, 2 pp.

* cited by examiner

*Primary Examiner* — Dhirubhai R Patel

(57) ABSTRACT

Fixture including a band and a holding member enables a long-size object to be held on a mounting member regardless of the holding member thickness. With the locking member on one side of the mounting member, one end of the band extends through a slot in the mounting member and through a first through-slot of the holding member, a contact surface of the holding member abutting the mounting member. The band extends around the long-size object held on a holding member holding surface, and through a second through-slot to a surface away from the holding surface and the abutting surface.

4 Claims, 4 Drawing Sheets

(A)

(B)

(C)

(D)

(A)

(B)

LONG-SIZE OBJECT FIXTURE

CROSS-REFERENCE TO RELATED APPLICATIONS

This application is a national phase application of International Patent Application No. PCT/EP2015/057617, filed Apr. 8, 2015, which claims priority to Japanese Patent Application No. JP 2014-079244, filed Apr. 8, 2014, both of which are incorporated by reference herein in their entireties for all purposes.

TECHNICAL FIELD

The present invention relates to a technical field of a long-size object fixture for holding a long-size object, such as a wire harness, an electric wire, or a cable, on a mounting member, such as a plate material.

BACKGROUND ART

In general, carelessly leaving a long-size object such as a wire harness, an electric wire, or a cable unattended is not preferable. Thus, a device is known in which a tying band wound around a long-size object is held at opposite ends of the band by a holding member that is fixed via a bolt to a mounting member such as a floor (see, for example, Patent Literature 1). However, since a nut is soldered to the mounting member and the holding member is fixed to the nut via a bolt, the device is disadvantageous in that not only is an operation of soldering the nut needed, but when the mounting member is a floor, the nut and the bolt also project from a floor surface, obstructing walking and the like.

Thus, a long-size object fixture is known in which a restraining portion is allowed to penetrate a through-slot drilled in a plate material, from a front surface of the plate material, and in which a leg piece projecting from the tying portion in V form is locked on a back surface of the plate material to retain the restraining portion, and in which a tying band projecting from a flange portion integrated with the restraining portion wound around a long-size object is supported by being sandwiched between elastic pieces projecting from the flange portion and fitted into the through-slot while being elastically deformed, thus allowing elimination of the need for a nut and a bolt (see, for example, Patent Literature 2).

[Patent Literature 1] Japanese Utility Model Application Publication No. H2-146289

[Patent Literature 2] Japanese Patent No. 5008982

However, in the long-size object fixture in Patent Literature 2 described above, the position on the back surface of the plate material where the leg piece is locked is fixed. Thus, the long-size object fixture can conform to only a plate material with a predetermined thickness. If the thickness of the plate material is varied, another type of fixture is needed, which has a leg piece corresponding to the varied thickness. This not only leads to an increased number of components but also needs the selection, for each plate material, of a long-size object fixture corresponding to the thickness of the plate material. Thus, the long-size object fixture exhibits poor workability. These are problems to be solved by the present invention.

DISCLOSURE OF THE INVENTION

With the foregoing in view, the present invention has been developed in order to solve the problems. An invention in claim 1 is a long-size object fixture for holding a long-size object, as represented by a cable, on a mounting member, this long-size object fixture including: a long size tying band provided with a locking portion at one end of the tying band, the locking portion penetrating a through-slot formed in the mounting member and being locked at a periphery of the through-slot on a side, from which locking portion appears, so as to be retained; and a holding member including an abutting contact surface that comes into abutting contact with the mounting member, a long-size object holding surface that holds the long-size object, a first through-slot extending from the abutting contact surface to the long-size object holding surface, and a second through-slot extending from the long-size object holding surface to a surface portion other than the long-size object holding surface and the abutting contact surface, wherein the long-size object is held on the mounting member by allowing the tying band with the locking portion locked in the through-slot to penetrate the first through-slot from the abutting contact surface to reach the long-size object holding surface and allowing the tying band wound around the long-size object on the long-size object holding surface to penetrate the second through-slot from the long-size object holding surface to reach another surface portion.

An invention in claim 2 is the long-size object fixture set forth in claim 1, in which the tying band is provided with a plurality of locking protrusions at predetermined intervals in a length direction, the first through-slot is provided with a first regulation piece that regulates movement of the tying band toward the abutting contact surface side, and the second through-slot is provided with a second regulation piece that regulates movement of the tying band toward the long-size object holding surface side.

An invention in claim 3 is the long-size object fixture set forth in claim 1 or claim 2, in which the holding member has a third through-slot through which an excess portion of the tying band penetrating the second through-slot and reaching the other surface portion is passed from the other surface portion to another surface portion.

An invention in claim 4 is the long-size object fixture set forth in any one of claims 1 to 3, in which the second through-slot is provided with a cancellation piece at an outlet portion of the second through-slot, the cancellation piece being subjected to a pulling operation to cancel locking of the second regulation piece on the locking protrusion.

According to the invention in claim 1, the tying band enables the long-size object to be held on the holding member side by using the tying band with the locking portion provided at one end of the tying band and allowed to penetrate the through-slot formed in the mounting member and locked at the periphery of the through-slot on a side from which the locking portion appears. Thus, even when the mounting member has a different thickness, the long-size object can be held so as to deal with a change in the length of the through-slot formed in the mounting member. Furthermore, the long-size object can be hold simply by winding, around the long-size object, the tying band locked in the mounting member and allowed to penetrate the first through-slot and reach the long-size object holding surface and threading a tip portion of the long-size object around which the tying band is wound, through the second through-slot to the different surface portion. As a result, the long-size object can be easily held so as to deal with a mounting member with a different thickness without the need to prepare a large number of tying bands corresponding to thicknesses.

According to the invention in claim 2, slipping-out of the tying band through the first through-slot or the second through-slot can be regulated, allowing the long-size object to be reliably held.

According to the invention in claim 3, a tying band having an increased length to deal with a change in the thickness of the mounting member can be shortened by threading an excess portion of the tying band through the third through-slot. Thus, the tying band can be restrained from causing obstruction.

According to the invention in claim 4, when maintenance work such as replacement of a long-size object is performed, cancellation of holding of and re-holding of a cable can be easily carried out.

BEST MODE FOR CARRYING OUT THE INVENTION

Figure 1:
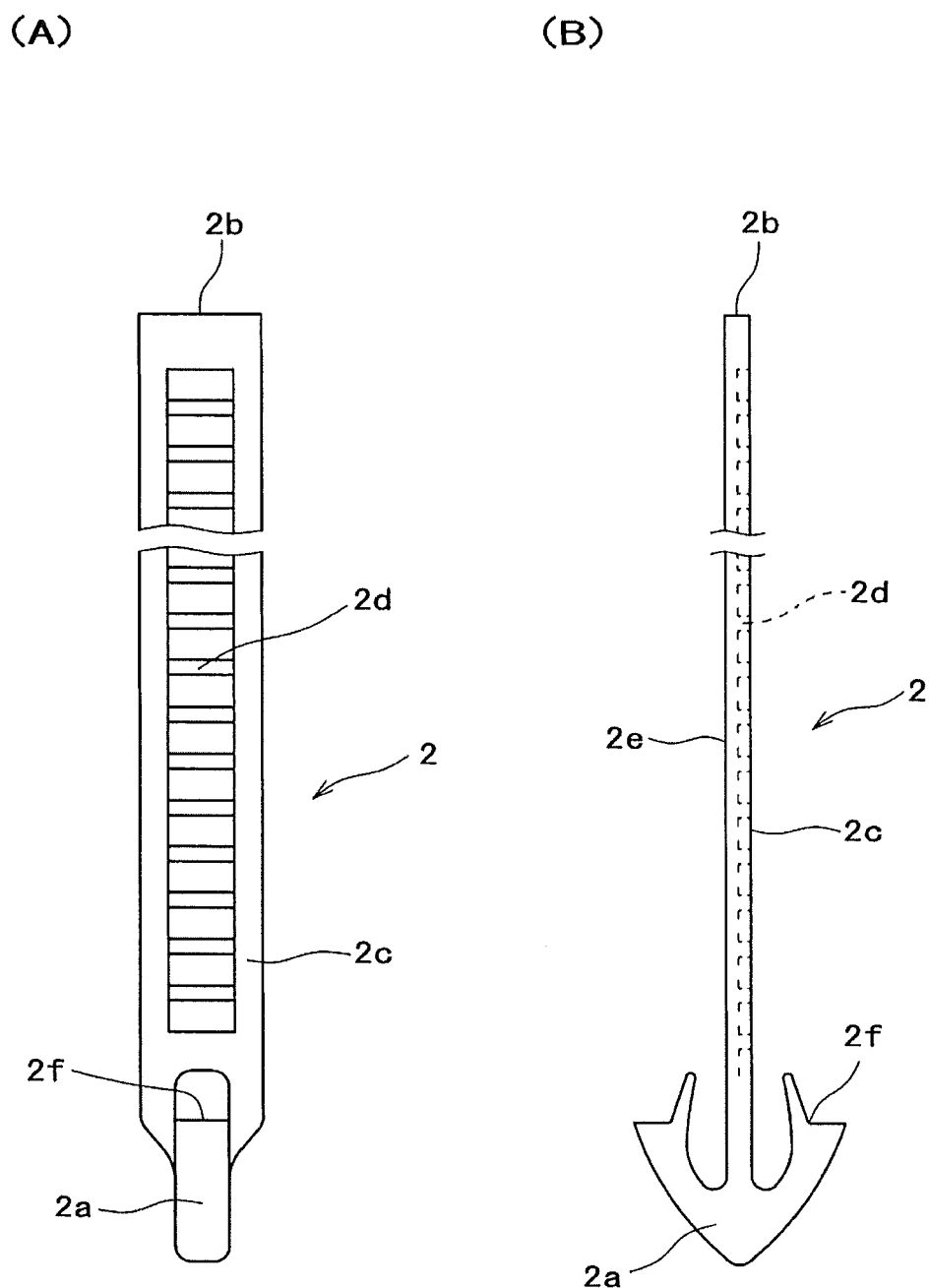
FIG. 1(A) and FIG. 1(B) are a front view and a side view, respectively, of a tying band.
Figure 2:
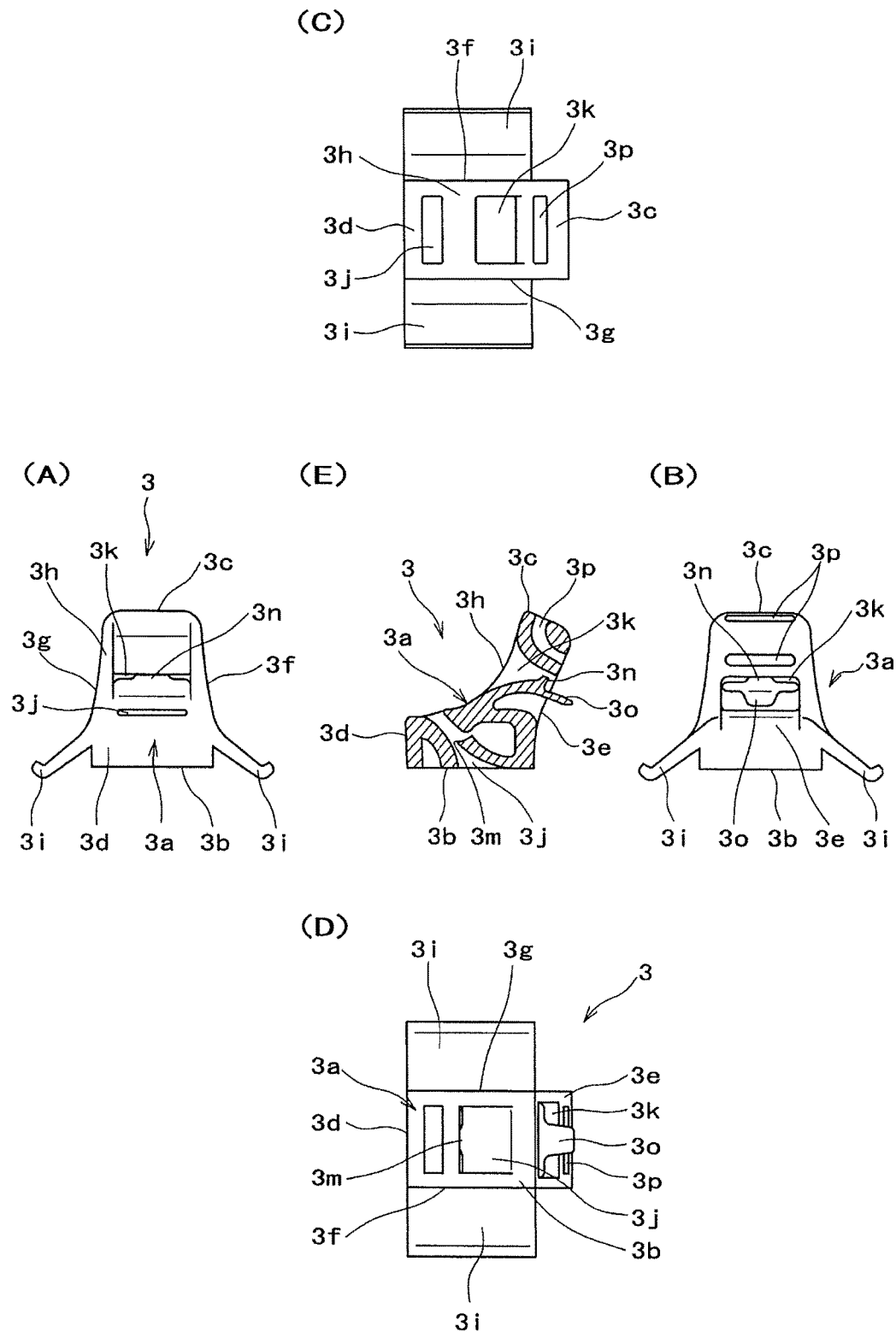
FIG. 2(A), FIG. 2(B), FIG. 2(C), FIG. 2(D), and FIG. 2(E) are a front view, a rear view, a plan view, a bottom view, and a cross-sectional side view, respectively, of a holding member.
Figure 3:
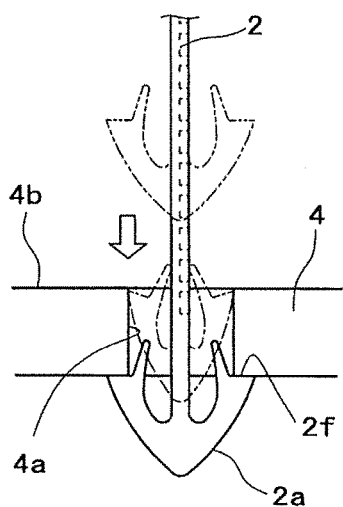
FIG. 3(A), FIG. 3(B), FIG. 3(C), and FIG. 3(D) are cross-sectional views for explaining the effects of holding a cable in use of a cable fixture by depicting a procedure for cable holding.
Figure 3:
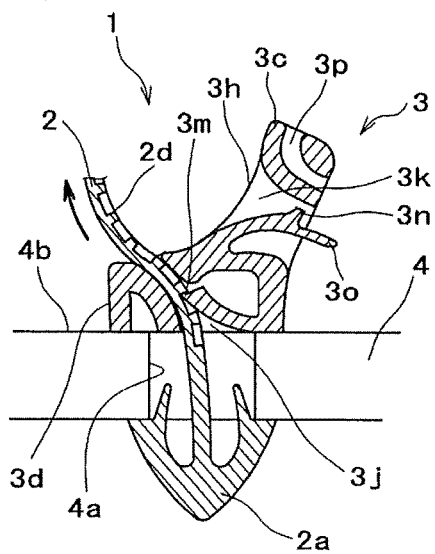
Figure 3:
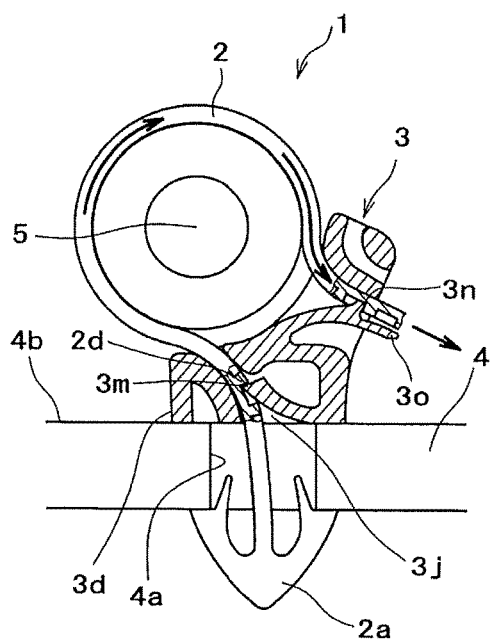
Figure 3:
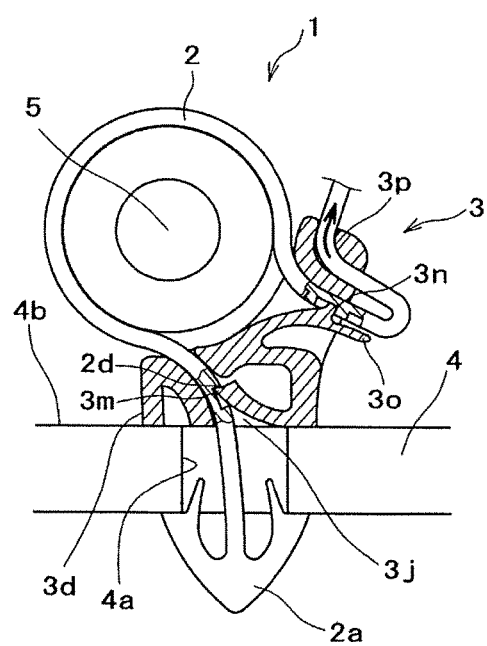
Figure 4:
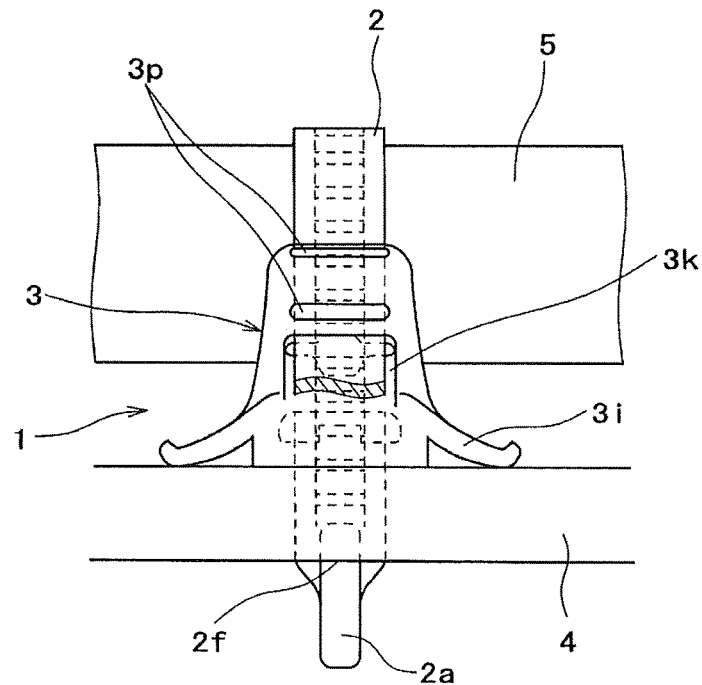
FIG. 4(A) and FIG. 4(B) are a partially cutaway rear view depicting that the cable is held and a diagram illustrating effects of the embodiment and depicting that locking of a second regulation piece on a locking protrusion is cancelled.
Figure 4:
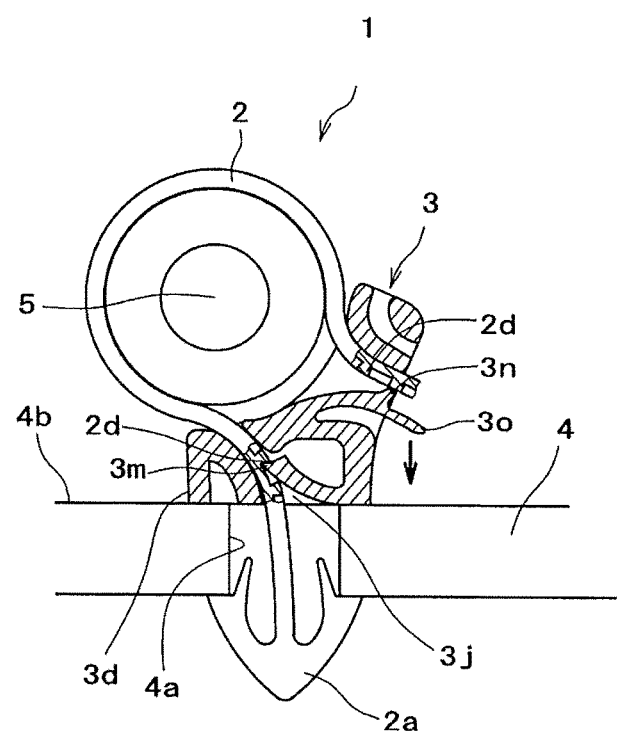

An embodiment of the present invention will be described below based on the drawings. In the drawings, 1 denotes a cable fixture (long-size object fixture), and the cable fixture 1 includes a long size tying band (tying string) 2 and a holding member 3 that holds the tying band 2. The held object is not limited to the cable, and the present invention can be implemented on various long-size objects such as a wire harness, an electric wire, a pipe, a tube, and a rod.

The tying band 2 is formed like a flat plate using a flexible material such as a synthetic resin. The tying band 2 has a anchor-like locking portion 2a formed at one end, and the other end 2b of the tying band 2 is a loose end. The tying band 2 has locking protrusions 2d provided on one side surface 2c of the tying band 2 at predetermined intervals in a length direction and which are long in a width direction. The other side surface 2e of the tying band 2 is planar. The tying band 2 is configured such that, when the locking portion 2a is forcibly fitted through a through-slot 4a drilled in a mounting member 4 such as a plate material so that the locking portion 2a is squashed, the locking portion 2a is open on a back surface side of the mounting member 4 and is set to a natural state and such that, when, in this state, the tying band 2 is pulled toward a front surface side of the mounting member 4, a locking stage portion 2f formed on the locking portion 2a is locked at a periphery of the through-slot 4a in the back surface and retained so as not to slip out toward the front surface side. Although, in the present embodiment, the tying band 2 is planar, the tying band 2 is not limited to this shape but may be, for example, shaped like a quadratic prism. Furthermore, when the tying band 2 is planar, the locking protrusions 2d may be provided on both side surfaces. If the tying band 2 is shaped like a quadratic prism, the present invention may be implemented even when the locking protrusions 2d are provided on, instead of only one surface, two surfaces, three surfaces, or all of the four surfaces.

On the other hand, the holding member 3 includes a main body portion 3a shaped like a mass. The main body portion 3a is provided with an abutting contact surface 3b that is a lower end surface coming into abutting contact with the front surface of the mounting member 4, an upper end surface 3c, a front end surface 3d and a rear end surface 3e, and a left end surface 3f and a right end surface 3g. The main body portion 3a further has a circular arc surface (inclined surface) extending from the upper end surface 3c to the front end surface 3d and has a height decreasing toward the front end surface 3d. The main body portion 3a has a cable holding surface 3h that holds a cable 5 as described below and a pair of leg pieces 3i projecting from the left and right end surfaces 3f and 3g, respectively, in an inclining manner so that the height of the leg piece 3i decreases toward a tip side of the leg piece and so that, when the abutting contact surface 3b is brought into abutting contact with the mounting member 4, the tip of the leg piece 3i is elastically deformed to come into abutting contact with the front surface of the mounting member 4. Moreover, the main body portion 3a has a first through-slot 3j passing from the abutting contact surface 3b to a front end side area of the cable holding surface 3h, a second through-slot 3k passing from a rear end side area of the cable holding surface 3h to the rear end surface 3e, and a third through-slot 3p passing from a position on the rear end surface 3e above the second through-slot 3k to the upper end surface 3c.

Inlets of the first and second through-slots 3j and 3k are set to have a size increasing toward an inlet end side so as to allow the tying band 2 to be easily inserted through the through-slots.

Furthermore, the first through-slot 3j is provided with a first regulation piece 3m that is locked on the locking protrusion 2d of the tying band 2 penetrating the through-slot 3j as described below to regulate movement of the tying band 2 toward the abutting contact surface 3b. The second through-slot 3k is provided with a second regulation piece 3n that is locked on the locking protrusion 2d of the tying band 2 penetrating the through-slot 3k as described below to regulate movement of the tying band 2 toward the cable holding surface 3h. On an area where the second regulation piece 3n is formed, a cancellation piece 3o is formed so as to project from the rear end surface 3e. An operation of depressing (an operation of pulling) the cancellation piece 3o allows cancellation of locking of the second regulation piece 3n on the locking protrusion 2d.

While facing toward the rear end surface 3e, the tying band 2 with the locking portion 2a locked and held in the through-slot 4a in the mounting member 4 is allowed to penetrate the first through-slot 3j from the abutting contact surface 3b so as to face toward the cable holding surface 3h. At this time, a portion of the tying band 2 passing through the slot and appearing from the cable holding surface 3h is adequately pulled to lock the first regulation piece 3m on any locking protrusion 2d so that the abutting contact surface 3b comes into tight contact with the front surface 4b of the mounting member 4.

Then, the portion of the tying band 2 passing through the slot and appearing from the cable holding surface 3h is wound around the cable 5 so that the locking protrusions 2d come into abutting contact with the cable 5. A tip portion of the wound tying band 2 is allowed to penetrate the second through-slot 3k from the cable holding surface 3h so as to face toward the rear end surface 3e. At this time, the tying band 2 passing toward the rear end surface 3e is adequately pulled to lock the second regulation piece 3n on any locking protrusion 2d so as to prevent a portion of the tying band 2 wound around the cable 5 from loosening. By implementing the above mentioned procedures, a mounting and holding operation itself, i.e., the operation of mounting and holding the cable 5 on the mounting member 4, is completed. However, if an excess portion of the tying band 2 projecting from the second through-slot 3k toward the rear end surface 3e side is long, the excess portion of the tying band 2 is allowed to penetrate the third through-slot 3p from the rear end surface 3e side to prevent the excess portion from projecting long from the rear end surface 3e to cause obstruction.

In the embodiment of the present invention configured as described above, when the tying band 2 is forcibly fitted through the through-slot 4a formed in the mounting member 4 under a condition where the locking portion 2a provided at one end of the tying band 2 is squashed, the locking portion 2a is opened and assumes a natural state. In this state, when a portion of the tying band 2 located on a front side of mounting member 4 is pulled, the locking portion 2a is locked at the periphery of the through-slot 4a on the side, from which the locking portion appears, so as to be retained. In this state, the tying band 2 is fitted into the first through-slot 3j of the holding member 3 from the abutting contact surface 3b side and drawn out toward the cable holding surface 3h side. At this time, the first regulation piece 3m is locked on the locking protrusion 2d so as to be retained, thus preventing the tying band 2 from slipping out toward the abutting contact surface 3b.

In this state, the tying band 2 is wound around the cable 5, and the wound tying band 2 is inserted into the second through-slot 3k so as to pass from the cable holding surface 3h toward the rear end surface 3e side. The passing tying band 2 is adequately pulled to properly tighten the cable 5. In this state, the second regulation piece 3n is locked on the locking protrusion 2d so as to be retained.

As described above, the embodiment of the present invention allows the cable 5 to be easily held using the cable fixture 1. In this regard, the locking portion 2a of the tying band 2 penetrates the through-slot in the mounting member 4 and is locked at the outer periphery of the through-slot on the back surface side, corresponding to the side from which the locking portion appears. Thus, even when the mounting member 4 has a different thickness, the cable 5 can be held so as to deal with a change in the length of the through-slot 4a formed in the mounting member 4. As a result, the cable 5 can be easily held so as to deal with a mounting member 4 with a different thickness without the need to prepare a large number of tying bands corresponding to thicknesses.

Furthermore, the tying band 2 is provided with the plurality of locking protrusions 2d at the predetermined intervals in the length direction. The first through-slot 3j is provided with the first regulation piece 3m that regulates slipping-out movement of the tying band 2 toward the abutting contact surface 3b side. Moreover, the second through-slot 3k is provided with the second regulation piece 3n that regulates slipping-out movement of the tying band 2 toward the cable holding surface 3h side. This enables slipping-out of the tying band 2 through the first through-slot 3j or the second through-slot 3k to be regulated, allowing the cable 5 to be reliably held.

In addition, in the embodiment, the holding member 3 has the third through-slot 3p through which the excess portion of the tying band 2 penetrating the second through-slot 3k and reaching the rear end portion 3e is passed from the rear end portion 3e to the upper end surface 3c. As a result, even if the tying band 2 has an increased length to deal with a change in the thickness of the mounting member 4, a portion of the tying band 2 otherwise sticking out from the mounting member 4 can be shortened by passing the excess portion of the tying band 2 through the third through-slot 3p. Thus, the tying band 2 can be restrained from causing obstruction.

Moreover, in the embodiment, the operation of depressing the cancellation piece 3o cancels locking and retaining of the second regulation piece 3n to allow the tying band 2 to be slipped out through the second through-slot 3k. This advantageously facilitates maintenance work such as replacement of the cable 5.

INDUSTRIAL APPLICABILITY

The present invention can be utilized in the field of long-size object fixtures for holding a long-size object such as a wire harness, an electric wire, or a cable on a mounting member.

EXPLANATION OF REFERENCE NUMERALS

1 Cable fixture
2 Tying band
2a Locking portion
2d Locking protrusion
3 Holding member
3b Abutting contact surface
3h Cable holding surface
3j First through-slot
3k Second through-slot
3p Third through-slot
3m First regulation piece
3n Second regulation piece
4 Mounting member
4a Through-hole
5 Cable

The invention claimed is:

1. A cable fixture for holding a cable on a mounting member, the fixture comprising:
   a tying band provided with a locking portion at one end of the tying band, the locking portion penetrating a through-slot formed in the mounting member and being locked at a periphery of the through-slot on a side of the mounting member, from which the locking portion appears, so as to retain the cable; and
   a holding member including an abutting contact surface that comes into abutting contact with the mounting member, a cable holding surface that holds the cable, a first through-slot extending from the abutting contact surface to the holding surface, and a second through-slot extending from the holding surface to a surface spaced from the holding surface, wherein
   the cable is held on the holding surface by allowing the tying band with the locking portion locked in the through-slot to penetrate the first through-slot from the abutting contact surface to reach the holding surface and allowing the tying band wound around the cable on the holding surface to penetrate the second through-slot from the holding surface to reach the surface spaced from the holding surface.

2. The cable fixture according to claim 1, wherein the tying band is provided with a plurality of locking protrusions at predetermined intervals in a length direction, the first through-slot is provided with a first regulation piece that resists movement of the tying band toward the abutting contact surface side, and the second through-slot is provided with a second regulation piece that resists movement of the tying band toward the holding surface.

3. The cable fixture according to claim 2, wherein the second through-slot is provided with a cancellation piece at an outlet portion of the second through-slot, the cancellation piece being subjected to a pulling operation to cancel locking of the second regulation piece on the locking protrusion.

4. The cable fixture according to claim 1, wherein the holding member comprises a third through-slot through which an excess portion of the tying band is disposed after penetrating the second through-slot.

* * * * *